(12) United States Patent
Uehara

(10) Patent No.: US 8,452,599 B2
(45) Date of Patent: May 28, 2013

(54) METHOD AND SYSTEM FOR EXTRACTING MESSAGES

(75) Inventor: Yasuo Uehara, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1020 days.

(21) Appl. No.: 12/482,415

(22) Filed: Jun. 10, 2009

(65) Prior Publication Data

US 2010/0318360 A1    Dec. 16, 2010

(51) Int. Cl.
 *G10L 13/08* (2006.01)
(52) U.S. Cl.
 USPC ........... 704/260; 725/131; 715/235; 715/229; 704/277; 704/275; 704/200; 701/1; 382/284; 382/209; 382/181; 382/128; 382/115; 382/101; 370/487; 358/3.28; 348/14.15
(58) Field of Classification Search
 USPC ........... 704/200, 277, 275; 725/131; 715/235, 715/229; 701/1; 382/284, 209, 181, 128, 382/115, 101; 370/487; 358/3.28; 348/14.14
 See application file for complete search history.

(56) References Cited

U.S. PATENT DOCUMENTS

| | | | |
|---|---|---|---|
| 3,519,805 A | 7/1970 | Thorne-Booth |
| 3,783,974 A | 1/1974 | Gilbert et al. |
| 3,828,236 A | 8/1974 | Close |
| 3,848,671 A | 11/1974 | Kern |
| 3,918,552 A | 11/1975 | Kameyama et al. |
| 4,075,500 A | 2/1978 | Oman et al. |
| 4,380,049 A | 4/1983 | Makinen |
| 4,760,529 A | 7/1988 | Takata et al. |
| 4,926,630 A | 5/1990 | Shekleton |
| 5,046,919 A | 9/1991 | Wulf |
| 5,186,270 A | 2/1993 | West |
| 5,421,432 A | 6/1995 | Strambi et al. |
| 5,434,927 A | 7/1995 | Brady et al. |
| 5,474,370 A | 12/1995 | Ravndal |
| 5,521,588 A | 5/1996 | Kuhner et al. |
| 5,604,821 A | 2/1997 | Ranganathan et al. |
| 5,739,657 A | 4/1998 | Takayama et al. |
| 5,774,591 A | 6/1998 | Black et al. |
| 6,246,787 B1 | 6/2001 | Hennessey et al. |
| 6,556,775 B1 | 4/2003 | Shimada |
| 6,647,324 B2 | 11/2003 | Creutzburg et al. |
| 6,690,815 B2 | 2/2004 | Mihara et al. |
| 6,731,777 B1 | 5/2004 | Nishigaki et al. |

(Continued)

FOREIGN PATENT DOCUMENTS

| | | |
|---|---|---|
| DE | 10330922 | 2/2005 |
| EP | 1614585 | 1/2006 |

(Continued)

*Primary Examiner* — Michael Colucci
(74) *Attorney, Agent, or Firm* — Snell & Wilmer LLP

(57) ABSTRACT

The present invention is a method and system for extracting messages from a person using the body features presented by a user. The present invention captures a set of images and extracts a first set of body features, along with a set of contexts, and a set of meanings. From the first set of body features, the set of contexts, and the set of meanings, the present invention generates a set of words corresponding to the message that the person is attempting to convey. The present invention can also use the body features of the person in addition to the voice of the person to further improve the accuracy of extracting the person's message.

20 Claims, 6 Drawing Sheets

U.S. PATENT DOCUMENTS

| | | |
|---|---|---|
| 6,804,396 B2 | 10/2004 | Higaki et al. |
| 6,853,738 B1 | 2/2005 | Nishigaki et al. |
| 6,907,335 B2 | 6/2005 | Oswald et al. |
| 6,963,656 B1 | 11/2005 | Persaud et al. |
| 6,985,623 B2 | 1/2006 | Prakash et al. |
| 7,000,200 B1 | 2/2006 | Martins |
| 7,018,166 B2 | 3/2006 | Gaskell |
| 7,056,185 B1 | 6/2006 | Anagnostou |
| 7,085,693 B2 | 8/2006 | Zimmerman |
| 7,106,887 B2 | 9/2006 | Kinjo |
| 7,142,600 B1 | 11/2006 | Schonfeld et al. |
| 7,218,011 B2 | 5/2007 | Hiel et al. |
| 7,230,538 B2 | 6/2007 | Lai et al. |
| 7,293,790 B2 | 11/2007 | Byun et al. |
| 7,340,077 B2 | 3/2008 | Gokturk et al. |
| 7,340,100 B2 | 3/2008 | Higaki et al. |
| 7,340,393 B2 | 3/2008 | Mitsuyoshi |
| 7,354,245 B2 | 4/2008 | Baba |
| 7,359,563 B1 | 4/2008 | Dua et al. |
| 7,370,466 B2 | 5/2008 | Cai |
| 7,383,238 B1 | 6/2008 | Iverson |
| 7,391,339 B2 | 6/2008 | Howard et al. |
| 7,403,640 B2 | 7/2008 | Zhang et al. |
| 7,440,615 B2 | 10/2008 | Gong et al. |
| 7,489,802 B2 | 2/2009 | Smilansky |
| 7,574,015 B2 * | 8/2009 | Desprez et al. .............. 382/101 |
| 7,641,288 B1 | 1/2010 | Baker et al. |
| 7,805,223 B2 * | 9/2010 | Yamaguchi et al. .............. 701/1 |
| 7,826,665 B2 * | 11/2010 | Bressan et al. ................ 382/181 |
| 7,930,627 B2 * | 4/2011 | Ming .......................... 715/229 |
| 8,077,930 B2 * | 12/2011 | Hauke ......................... 382/115 |
| 2002/0111794 A1 * | 8/2002 | Yamamoto et al. .......... 704/200 |
| 2003/0075907 A1 | 4/2003 | Baumann et al. |
| 2003/0194134 A1 * | 10/2003 | Wenzel et al. ................ 382/209 |
| 2005/0002561 A1 | 1/2005 | Monachino et al. |
| 2005/0063566 A1 | 3/2005 | Beek et al. |
| 2005/0071368 A1 * | 3/2005 | Kim et al. ..................... 707/102 |
| 2005/0085984 A1 | 4/2005 | Uhler et al. |
| 2005/0097541 A1 | 5/2005 | Holland |
| 2005/0180462 A1 * | 8/2005 | Yi ............................... 370/487 |
| 2005/0237577 A1 * | 10/2005 | Alasia et al. .................. 358/3.28 |
| 2005/0267761 A1 * | 12/2005 | Ueno .......................... 704/277 |
| 2006/0028556 A1 | 2/2006 | Bunn et al. |
| 2006/0045354 A1 | 3/2006 | Hanna et al. |
| 2006/0104488 A1 | 5/2006 | Bazakos et al. |
| 2006/0122840 A1 * | 6/2006 | Anderson et al. ............. 704/275 |
| 2006/0265731 A1 * | 11/2006 | Matsuda ....................... 725/131 |
| 2007/0003118 A1 * | 1/2007 | Wheeler et al. ............... 382/128 |
| 2007/0011012 A1 * | 1/2007 | Yurick et al. ................. 704/277 |
| 2007/0027604 A1 | 2/2007 | Cuevas et al. |
| 2007/0065040 A1 * | 3/2007 | Ming .......................... 382/284 |
| 2007/0067713 A1 * | 3/2007 | Ming .......................... 715/511 |
| 2007/0098222 A1 | 5/2007 | Porter et al. |
| 2007/0140595 A1 | 6/2007 | Taylor et al. |
| 2007/0147678 A1 | 6/2007 | Gotting et al. |
| 2007/0211947 A1 | 9/2007 | Tkacik |
| 2007/0297647 A1 | 12/2007 | Hung-Chi |
| 2008/0002856 A1 | 1/2008 | Ma et al. |
| 2008/0049150 A1 | 2/2008 | Herbin et al. |
| 2008/0056548 A1 | 3/2008 | Irarrazaval et al. |
| 2008/0061559 A1 | 3/2008 | Hirshberg |
| 2008/0063273 A1 | 3/2008 | Shimodaira |
| 2008/0069400 A1 | 3/2008 | Zhu et al. |
| 2008/0095435 A1 | 4/2008 | Lipton et al. |
| 2008/0144961 A1 | 6/2008 | Litzenberger et al. |
| 2008/0170748 A1 | 7/2008 | Albertson et al. |
| 2008/0186386 A1 | 8/2008 | Okada et al. |
| 2008/0220692 A1 | 9/2008 | Torres et al. |
| 2008/0253617 A1 | 10/2008 | Ernst et al. |
| 2008/0260210 A1 | 10/2008 | Kobeli et al. |
| 2008/0260212 A1 | 10/2008 | Moskal et al. |
| 2008/0273765 A1 | 11/2008 | Tsujimura |
| 2008/0292151 A1 | 11/2008 | Kurtz et al. |
| 2008/0298642 A1 * | 12/2008 | Meenen ....................... 382/115 |
| 2009/0003661 A1 | 1/2009 | Ionita et al. |
| 2009/0041297 A1 | 2/2009 | Zhang et al. |
| 2009/0060287 A1 | 3/2009 | Hyde et al. |
| 2009/0079816 A1 * | 3/2009 | Qvarfordt et al. .......... 348/14.16 |
| 2009/0087308 A2 | 4/2009 | Presz, Jr. et al. |
| 2009/0097964 A1 | 4/2009 | Presz, Jr. et al. |
| 2009/0146842 A1 | 6/2009 | Jung |
| 2010/0038960 A1 | 2/2010 | Takenaka et al. |
| 2010/0096905 A1 | 4/2010 | Takenaka et al. |

FOREIGN PATENT DOCUMENTS

| | | |
|---|---|---|
| JP | 58086803 | 5/1983 |
| JP | 9058461 | 3/1997 |
| JP | 9-288573 | 11/1997 |
| JP | 2003259502 | 9/2003 |
| JP | 2003338997 | 11/2003 |
| JP | 2004-005506 | 1/2004 |
| JP | 3738266 | 1/2006 |
| JP | 2006335277 | 12/2006 |
| JP | 2007094990 | 4/2007 |
| JP | 2007196867 | 8/2007 |
| JP | 2007210576 | 8/2007 |
| JP | 2008279848 | 11/2008 |
| WO | WO 86-03132 | 6/1986 |
| WO | WO 2007029454 | 3/2007 |
| WO | WO 2007039927 | 4/2007 |
| WO | WO 2007132323 | 11/2007 |

* cited by examiner

METHOD AND SYSTEM FOR EXTRACTING MESSAGES

BACKGROUND

1. Field of the Invention

The present invention relates to a method and system for extracting messages. More specifically the present invention relates to a method and system for extracting messages using body features.

2. Description of the Related Art

Modern consumers are increasingly searching for better and easier ways to have their messages understood. Conventional methods require that the consumer speak to each other in person or over the telephone through purely audible means. However such methods are undesirable where the person speaks a language that is not easily understood, there is a poor line of communication, the person is speaking in a low voice, or the person listening has difficulty hearing.

Furthermore, messages can also be conveyed to not only people, but also to machines. Conventionally machines required manual interaction with the consumer in order for the consumer to convey to the machine exactly what the consumer wanted the machine to do. Such methods are undesirable as the person must use his hands to operate the machine limiting the range he can be away from the machine and also increasing an amount of energy the user has to expend. Companies have found that voice recognition systems allow the person to extend the distance with which he could interact with the machines.

However, voice recognition systems for human-to-machine interaction suffer from many of the same problems as human-to-human interaction. Voice recognition systems are often inaccurate and thus limit the amount of instructions the consumer can provide, limit the capabilities of the machine, and can frustrate the consumer leading to the eventual interaction with the machine by hand anyways.

Thus, there is a need for a more efficient and accurate way to extract messages from the consumer.

SUMMARY

The present invention is a method and system for extracting messages from a person using the body features presented by a user. The present invention captures a set of images and extracts a first set of body features, along with a set of contexts, and a set of meanings. From the first set of body features, the set of contexts, and the set of meanings, the present invention generates a set of words corresponding to the message that the person is attempting to convey. Since the person conveys his message using not only his voice, but also his body language, the present invention can determine the person's message. Such determinations may be more accurate since a wide range of body features can be used to extract the person's message, such as lips, facial expression, arm gestures, posture, etc.

In addition, since images for body features can have a higher resolution and/or can be easier to process than audio data for voice, the present invention can provide a higher level of accuracy for determining the person's message. Furthermore, the present invention can also use the body features of the person in conjunction with the voice of the person to further improve the accuracy of extracting the person's message.

In one embodiment, the present invention is a message extraction system including an image capture unit obtaining a set of images, a first features extraction unit communicatively coupled to the image capture unit to extract a first set of body features from the generated set of images, a words extraction unit communicatively coupled to the first features extraction unit to generate a first set of words from the first set of body features, a second features extraction unit communicatively coupled to the words extraction unit to generate a second set of body features from the generated first set of word, and a features comparator communicatively coupled to the first features extraction unit and the second features extraction unit to determine whether the first set of body features matches the second set of body features and outputting the generated first set of words when the first set of body features matches the second set of body features.

In another embodiment, the present invention is a message extraction system including a visual data processing system obtaining a set of images and generating a first set of words based on the set of images, an audio data processing system obtaining a set of audio inputs and generating a second set of words based on the set of audio inputs, and a words integrator communicatively coupled to the visual data processing system and the audio data processing system to integrate the generated set of first words and the generated second set of words to generate an integrated set of words.

In yet another embodiment, the present invention is a method for extracting a message including obtaining a set of images, extracting a first set of body features corresponding to the set of images, generating a first set of words from the first set of body features, generating a second set of body features from the first set of word, comparing the first set of body features to the second set of body features to determine whether the first set of body features matches the second set of body features, and outputting the first set of words when the first set of body features matches the second set of body features.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
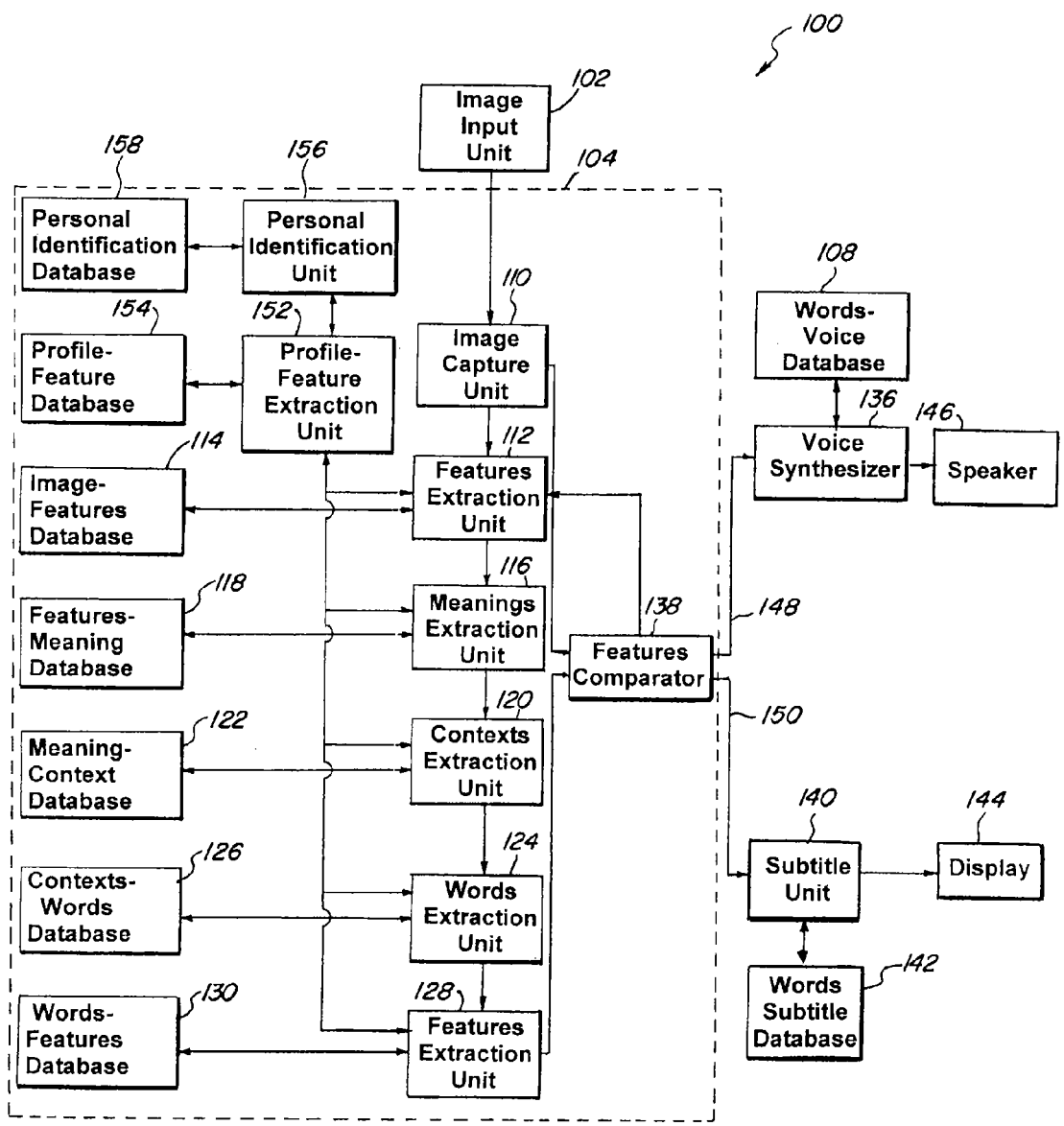
FIG. 1 is a block diagram of an embodiment of the present invention.

As seen in FIG. 1, in one embodiment, the present invention is a message extracting system 100. The message extraction system 100 includes, for example, an image input unit 102, a visual data processing system 104, a voice synthesizer 106, a words-voice database 108, a speaker 146, a subtitle unit 140, a words-subtitle database 142, and a display 144.

The image input unit 102 can be, for example, a digital camera, a video camera, a heat sensor, an infrared camera, or any other image device capable of generating, capturing, or receiving an image. The image input unit 102 can be strategically positioned to capture images of a relevant body feature. For example, if a relevant body feature is a face of a person, then the image input unit 102 can be placed to capture images of the face. Likewise, if the relevant body features are the hands of the person, then the image input unit 102 can be placed, for example, to face the hands of the person in order to capture images of the hands. The image input unit 102 can also be appropriately zoomed in or out. For example, if the relevant body features included both the face and the hands of the person, then the image input unit 102 can be appropriately zoomed out to include both the face of the person and the hands of the person. However, if the relevant body feature was only the face of the person, then the image input unit 102 can be appropriately zoomed in to include only the face of the person. In addition, a resolution of the set of images can be appropriately adjusted based on the amount of detail required to extract the message from the set of images and/or processing efficiency.

The visual data processing system 104 receives a set of images and generates a set of words based on the received set of images. The visual data processing system 104 includes an image capture unit 110, a features extraction unit 112, a features database 114, a meanings extraction unit 116, a features-meaning database 118, a contexts extraction unit 120, a meaning-context database 122, a words extraction unit 124, a contexts-words database 126, a features extraction unit 128, a words-features database 130, a features comparator unit 138, a profile-feature extraction unit 152, a profile-feature database 154, a personal identification unit 156, and a personal identification database 158.

The image capture unit 110 obtains the images to be utilized by the visual data processing system 104. For example, if the image input unit 102 is a video camera, the image capture unit 110 activates a CCD of the video camera to obtain images at select intervals. The features extraction unit 112 receives a set of images and extracts a first set of body features from the set of images using the features database 114.

The features database 114 includes, for example, communication features that correspond to images. The communication features can include, for example, body features, written language, pictures, colors, shapes, Morse code, semaphore, coded signs, or other means of communication. The body features can include, for example, mouth features, facial features, body features, hand gestures, finger gestures, sign language, flag signaling, messages written in air, situational features, body postures, speed of body gestures, pupil dilation, eye gestures, winks, attitude based gestures, body motions, or any other types of features which can provide information regarding what message the person is trying to communicate. The present invention can use one or more of the communication features listed above in singularity or in combination. The present invention will be described, for example, using body features, but such use is merely exemplarily and not limiting.

When a person speaks or attempts to communicate with another person, his body features can also inform people as to the message he is conveying or the message he is trying to say. For example, in forming words for the message, a person will shape his lips in a certain manner. Furthermore, in addition to shaping his lips, if a person is conveying a sad message, his facial expressions will also reflect such a sentiment. Thus, by using the body features which correspond to the images, a better understanding of the message the person is attempting to communicate can be understood.

The meanings extraction unit 116 receives a first set of body features and generates a set of meanings using the feature-meaning database 118. The feature-meaning database 118 can include, for example, the type of feelings or emotions that corresponds to the body features and the message the person is trying to convey. For example, if the person is saying "I WON THE LOTTERY!" he will have a happiness type of emotion corresponding to his message. To reflect such emotion, normally the person will have a smile or present other body features such as large hand gestures to indicate that the person is happy. However, if the person is saying "I LOST THE LOTTERY!" he will have a sad type of emotion corresponding to his message. He may have a sad face, or have a slouched posture. Although only a single word has changed, the emotion associated with the message is drastically different.

This may useful where a message is missing a word. For example, if the message was missing the word in the [blank] such as "I [BLANK] THE LOTTERY," then ordinarily it would be difficult to determine whether the person won or lost the lottery. However, by extracting the meanings from the first set of body features, then an emotion of the person can be determined. This can aid in determining whether the word should be "LOST" or "WON" in place of the [blank]. Thus, by extracting the meaning from the body features, it will be easier to understand the message.

The contexts extraction unit 120 receives the set of meanings and generates a set of contexts using the meaning-context database 122. The meaning-context database can include the context of the message the person is attempting to convey corresponding to the set of meanings that have been extracted. The context, for example, can include the topics the message is conveying. For example, the topics can include sports, lottery, weather, etc. For example, if the person is talking about sports and suddenly a person says either "THE TIGERS ARE LOOSE" or "THE TIGERS LOST," the person probably meant to say "THE TIGERS LOST" because the Detroit Tigers is Detroit's baseball team and the person is talking about sports. Furthermore, if the set of meanings confirms that the person has a sad face then the person is probably talking about the Tigers losing. However, if the person has an excited or shocked set of emotions, then the person is probably talking about the tigers being loose. In addition to receiving the set of contexts from the meanings extraction unit, the context extraction unit can also receive the first set of body features to aid in determining the context of the message.

The words extraction unit 124 receives the set of meanings and generates a set of words using the contexts-words database 126. The set of words, for example, can be the message, or a portion of the message, that the person is trying to convey. The words extraction unit 124 could also receive the first set of body features, and/or the set of meanings in addition to the set of context in order to determine the set of words that should be generated. In one embodiment, the present invention generates a single set of words. In another embodiment, the present invention generates multiple sets of words and allows a user to determine which set of words to use as will be described below.

A personal identification unit 156 can obtain personal identification data from the person and use the personal identification database 158 to determine an identity of the person. The identity of the person can be used by the profile-feature extraction unit, which will be described below. The personal identification database 158 contains personal identities that correspond to the personal identification data. The personal identification data can be data that the person communicates to the personal identification unit 156 and/or the personal identification data that the personal identification unit 156 collects. The personal identification data can be, for example, the ID in a person's key, the ID in a person's key fob, a user name and/or password, an identification code, a fingerprint, a retinal scan, a voice identification data, or any other data that can be used to identify the person. In one embodiment, the personal identification unit 156 can also receive images from the image capture unit 110 and/or the image input unit 102, which can be used to determine and/or authenticate the identify of the person.

The profile-feature extraction unit 152 is receives the first set of body features, the identify of the person, the set of meanings, the set of context, the set of words, and/or the set of second body features and generates and/or retrieves a profile of the person using the profile-features database 154. This allows a better understanding of the nature and/or tendencies of the person, which can aid in determining the meaning of the message. For example, if the person is constantly talking about sports, then it is likely that the person is actually saying "THE TIGERS LOST" instead of "THE TIGERS ARE LOOSE." Furthermore, the profile of the person can also indicate habits or characteristics of the person such as whether the person has a disability, has certain communication preferences, etc.

Thus, the profile-feature extraction unit 152 can also interact with the features extraction unit 112, the meanings extraction unit 116, the contexts extraction unit 120, the words extraction unit 124, and/or the features extraction unit 128 in order to allow each of the units to better decide how to generate the first set of body features, the set of meanings, the set of contexts, the set of words, and/or the set of second body features. Any information collected from the first set of body features, the set of meanings, the set of context, the set of words, and/or the set of second body features can also be stored in the profile-feature database 154 for future reference.

Furthermore, the profile-feature extraction unit 152 can also be configured to recognize the types of messages that are being conveyed and which features to focus on. For example, if the person is drawing pictures or letters on a board, then the profile-feature extraction unit 152 can instruct the features extraction unit 112 to focus more on either the pictures or the letters on the board based on the prior tendencies of the person.

The features extraction unit 128 receives the set of words and generates a second set of body features using the words-features database 130. The words-features database 130 includes body features which should correspond to one or more of the words in the set of words.

The features comparator 138 receives the set of words, the first set of body features, and the second set of body features. The features comparator 138 compares the first set of body features with the second set of body features to determine if they match or not. If the first set of body features matches with the second set of body features, then the features comparator 138 outputs the set of words to the voice synthesizer 136 and/or the subtitle unit 140 using the output signal 148 and the output signal 150, respectively. A match can be an exact match, a partial match, a match with a predetermined confidence level, or any other type of algorithm which determines that the second set of body features is appropriately similar to the first set of body features. In the situation where the words extraction unit 124 generates multiple sets of words, the features comparator 138 can perform the matching function for some or all of the multiple set of words. Furthermore, the features comparator 138 can also present the multiple set of words to the person for verification and/or selection of the most appropriate set of words. The most appropriate set of words can be some or all of the multiple set of words.

However, if the first set of body features does not match with the second set of body features, then the features comparator 138 instructs the image capture unit 110 to obtain another set of images. When the first set of body features does not match with the second set of body features, the features comparator 138 can also optionally send an error signal to the voice synthesizer 136 and/or the subtitle unit 140 using the output signal 148 and the output signal 150.

Since the second set of body features correlates with the set of words, a comparison of the first set of body features with the second set of body features ensures that the set of words that is generated by the words extraction unit 124 has a predetermined level of accuracy. Thus, if the set of words generated corresponds to a second set of body features, which is completely different from the first set of body features, then it is unlikely that the set of words is accurate. However, if the set of words generated corresponds to a second set of body features, which matches the first set of body features, then it is likely that the set of words is accurate.

The voice synthesizer 106 receives the set of words and/or the error signal from the features comparator 138. When the voice synthesizer 106 receives the set of words, it generates a set of audio signals using the words-voice database 108. The words-voice database contains audio signals which should be generated corresponding to the set of words. The set of audio signals, for example, can correspond to a voice enunciating the set of words, a sound corresponding to the set of words, or any other type of audible noise which indicates the set of words. The set of audio signals are transmitted to the speaker 146 for broadcast. However, if the voice synthesizer 106 receives the error signal, then it can output an audio signal indicating to the person that there was an error. For example, the voice synthesizer 136 could cause the speaker 146 to output a synthetic voice corresponding to "SORRY, MESSAGE NOT UNDERSTOOD," "PLEASE REPEAT COMMAND," or any other error message.

The subtitle unit 140 receives the set of words and/or the error signal. When the subtitle unit 140 receives the set of words, the subtitle unit generates a set of subtitles using the words-subtitle database 142. The words-subtitle database contains subtitles which correspond to the words. For example, if the words are "HELLO WORLD," then a subtitle for "HELLO WORLD" can be generated in the appropriate language, font, and/or display location and displayed on the display 144. The set of subtitles can be displayed on the display 144. If, however, the subtitle unit 140 receives the error signal from the features comparator 138, then the subtitle unit 140 can display an error message on the display 144.

Furthermore, the present invention can be used, for example, in a variety of application such as in an automobile during normal transportation, in an automobile after an accident, as a video conferencing system, as a translation system, as a dictation system, as a system to help deaf people, as a system to help other types of disabled people, or any other type of system where it would be advantageous to extract a message that a person is attempting to convey without relying solely on a voice capture of the person. For example, during a normal transportation of people in an automobile, the present invention can be used to control and activate the electronic equipment in the automobile. During an accident, the present invention can be used by the person in the automobile to indicate that he needs help. The present invent would be especially advantageous since the person may have an inability to speak loudly and/or enunciate carefully.

In a video conferencing system, the present invention can be used to display subtitles when the person is speaking. This may allow a better understanding of what the person is saying, especially when there is a low bandwidth and it is difficult to hear what the person is saying or see the person's body gestures.

The present invention can also be used as a translation system where a person is speaking a foreign language. In such a case, the body features, meanings, and the contexts, may allow a better understanding of the message the person is attempting to convey instead of attempting to translate what the person is saying word-for-word. In such a case, in a video conference, subtitles can be displayed to indicate what the person is saying.

Likewise, by utilizing a person's body features in addition or instead of the person's audible speech, the present invention can be used for an automated dictation system. This could improve the quality of the dictation since the accuracy of the dictation will improved with the use of the body features.

In addition, the present invention can also be used for deaf people. Since deaf people often use sign language to communicate with other people, the present invention can be configured to recognize sign language. This can allow the deaf person to better communicate with other people and/or operate equipments.

The present invention, however, is not limited to only helping deaf people. The present invention can also be useful for people with other disabilities whether their motor skills may be impaired. For example, if a person has one or both hands disabled, he will not be able to type. Thus, the person will have a difficult time operating a computer or any other type of electronic equipment. By utilizing the present invention, the person's facial features, which remain undamaged, may be used in addition to or instead of his vocal commands to operate the computer or other type of electronic equipment.

Thus, the features comparator 138 can also output the set of words and/or the error signal to other components such as an engine control unit ("ECU") in an automobile, a processor in a computer, or any other type of device which would be relevant in the interaction between the message extraction system 100 and the person. For example, if the message extraction system 100 was used in an automobile to determine commands from the person to operate electronic equipment, such as a global positioning system, or a mobile phone, the features comparator 138 could send the set of words and/or the error signal to the ECU. Based on the set of words, the ECU could determine an appropriate command and execute the command. Thus, if the set of words was "OPERATE THE GPS SYSTEM," the ECU could recognize that the set of words indicate that the GPS system should be activated and activate the GPS system.

Likewise, if the message extraction system 100 was used for a disabled person to operate a computer, then the features comparator 138 could send the set of words and/or the error signal to the processor in the computer. Thus, if the set of words was "INDENT THE PARAGRAPH," the processor could recognize that the set of words indicate that a word processing program should indent a paragraph and instruct the word processing program to indent the paragraph.

Figure 2:
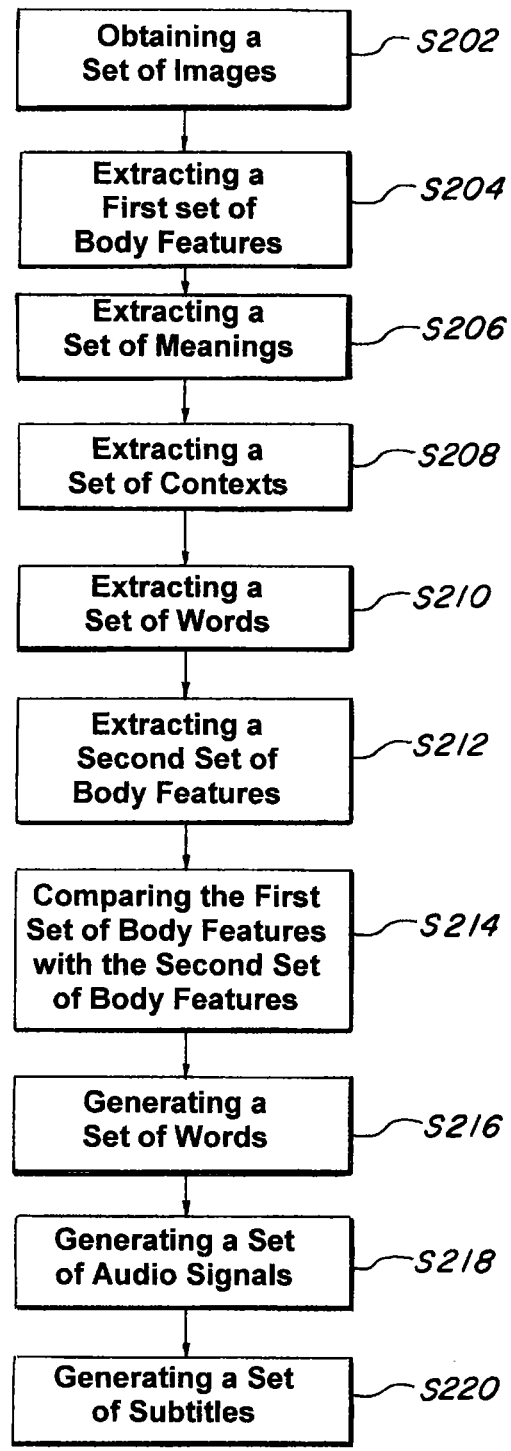
FIG. 2 is a flow chart of a process for extracting a message according to an embodiment of the present invention.

FIG. 2 is a flow chart for a process for extracting a message from a person according to an embodiment of the present invention. In Step S202, a set of images is obtained. For example, image capture unit 110 obtains a set of images from the image input unit 102. In Step S204, a first set of body features is extracted from the set of images. For example, the features extraction unit 112 extracts the first set of body features from the set of images using the features database 114. In Step S206, a set of meanings is extracted from the first set of body features. For example, the meanings extraction unit 116 extracts the set of meanings from the first set of body features using the features-meaning database 118.

In Step S208, a set of contexts is extracted. For example, the contexts extraction unit 120 extracts the set of contexts from the set of meanings using the meaning-context database 122. The contexts extraction unit 120 can also extract the set of contexts using the first set of body features in addition to the set of meanings. In Step S210, a set of words is extracted. For example, the words extraction unit 124 extracts a set of words from the set of contexts using the contexts-words database 126. The words extraction unit 124 can also use the first set of body features and/or the set of meanings in extracting the set of words. In Step S212 a second set of body features is extracted. For example, the features extraction unit 128 extracts the second set of body features from the set of words using the words-features database 130.

In Step S214, the first set of body features is compared with the second set of body features. For example, the features comparator 138 compares the first set of body features with the second set of body features to determine if there is a match between the first set of body features and the second set of body features. If there is no match, the method starts again at Step S202.

If there is a match, then the method proceeds to Step S218. In Step S218, a set of audio signals is generated corresponding to the set of words. For example, voice synthesizer 136 generates the set of audio signals corresponding to the set of words using the words-voice database 108. The audio signals can be broadcast using the speaker 146. In Step S220, a set of subtitles is generated corresponding to the set of words. For example, subtitle unit 140 generates the set of subtitles corresponding to the set of words using the words-subtitle database 142. The subtitles can be displayed using the display 144.

Figure 3:
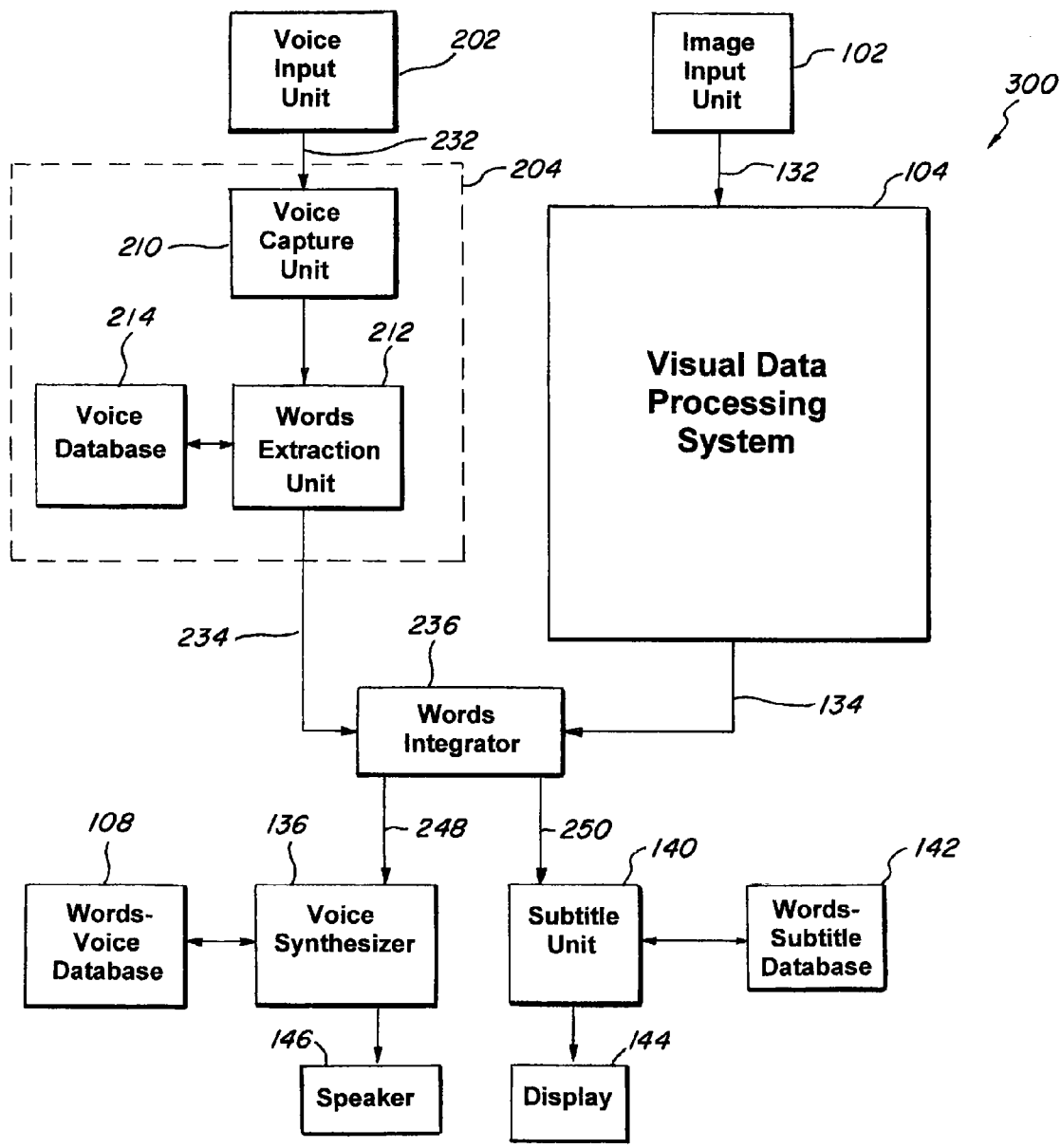
FIG. 3 is a block diagram of an alternate embodiment of the present invention.

FIG. 3 depicts a data processing system 300 according to another embodiment of the present invention. The message extraction system 300 includes, for example, the image input unit 102, the visual data processing system 104, a voice input unit 202, an audio data processing system 204, a words integrator 236, the voice synthesizer 136, the words-voice database 108, the speaker 146, a subtitle unit 240, a words-subtitle database 142, and a display 144.

The visual data processing unit 104 receives an image input signal 132 including a set of images from the image input unit 102. The visual data processing unit 104 generates an output signal 134 from the image input signal 132. The output signal 134 includes, for example, a first set of words generated from the set of images and the set of images.

The voice input unit 202 can be, for example, a microphone, a sound storage medium, a speaker, or any other type of device which can provide a set of audio inputs. In the current embodiment, the audio input is a voice input.

The audio data processing unit 204 receives an audio input signal 232 including a set of audio inputs from the voice input unit 202. The audio data processing unit 204 generates an output signal 234 from the audio input signal 232. The output signal 234 includes, for example, a second set of words generated from the set of audio inputs and the set of audio inputs.

The audio data processing unit 204 includes a voice capture unit 210, a words extraction unit 212, and a voice database 214. The voice capture unit 210 receives the audio input signal 232 and transmits the set of audio inputs to the words extraction unit 212. The voice capture unit 210 can control the voice input unit 202 and can, for example, instruct the voice input unit 202 to transmit the audio input signal 232. The words extraction unit 212 receives the set of audio inputs and generates a second set of words using the voice database 212. The words extraction unit 212 transmits the output signal 234 including the second set of words and the set of audio inputs to the words integrator 236.

Figure 4:
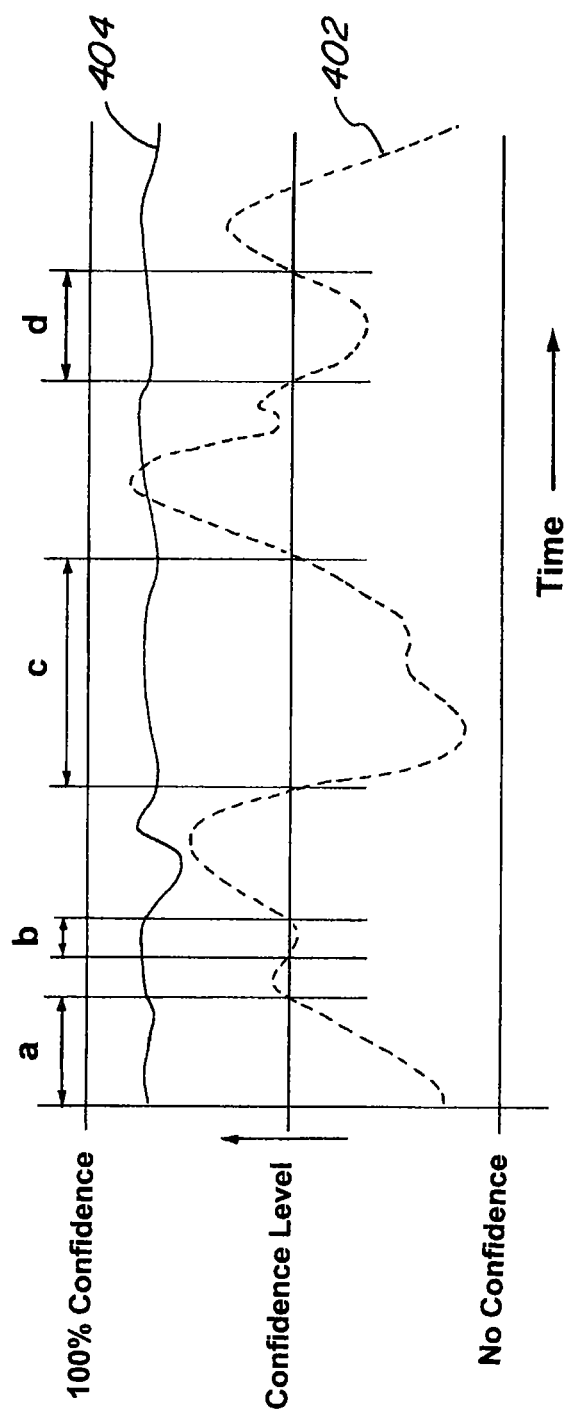
FIG. 4 a graph depicting confidence levels of audio data versus visual data according to an embodiment of the present invention.

The words integrator 236 receives the output signal 134 and the output signal 234. Referring to FIG. 4, the words integrator 236 analyzes the set of audio inputs and the set of images to determine a confidence level for the set of audio inputs and a confidence level for the set of images. The confidence level for the set of audio inputs is depicted by line 402 while the confidence level for the set of images is depicted by line 404. In one embodiment, the respective confidence level indicates an accuracy of the set of audio inputs and/or the set of images. In another embodiment the respective confidence level indicates an amount of noise in the set of audio inputs and/or the set of images. In yet another embodiment, the respective confidence level indicates the likelihood that the first set of words and/or the second set of words can be generated accurately.

The words integrator 236 indicates the confidence level for the set of audio inputs and the confidence level for the set of images to determine which words to selectively include in an integrated set of words. For example, in sections a, b, c, and d, the confidence level for the set of audio inputs is low. Thus, the words integrator 236 can select words from the first set of words which correspond to the sections a, b, c, and d. With respect to the remaining sections, the words integrator can compare the words in first set of words with the words in the second set of words to determine if they match or not. If they do not match, then the words integrator 236 can use other algorithms to determine which words to select.

In one embodiment, the words integrator 236 selects words from the first set of words or the second set of words based on the confidence level of the set of image inputs or the set of audio inputs. In another embodiment, the words integrator 236 selects words from the first set of words or the second set of words based on which of the words would complete the integrated set of words to more accurately reflect the meaning the person is trying to convey. For example, if the first set of words indicate that the word is "HIT" and the second set of words indicate the word is "HATE," the words integrator 236 would select "HIT" where the phrase is "[BLANK] THE BASEBALL" and the words integrator 236 would select "HATE" where the phrase is "I HATE HOMEWORK." The words integrator 236 could also extract the first set of body features from the set of images and/or receive, the first set of body features from the visual data processing unit 104 in order to determine which words to select.

The words integrator 236 can transmit an integrated set of words output 248 and an integrated set of words output 250 to the voice synthesizer 136 and the subtitle unit 140, respectively. The voice synthesizer 136 can generate a set of audio signals from the integrated set of words from the integrated set of words output 248 using the words-voice database 108. The voice synthesizer 136 can then instruct the speaker 146 to output the set of audio signals. The subtitle unit 140 can generate a set of subtitles from the integrated set of words from the integrated set of words output 250 using the words-subtitle database 142. The set of subtitles can be displayed using display 144.

Figure 5:
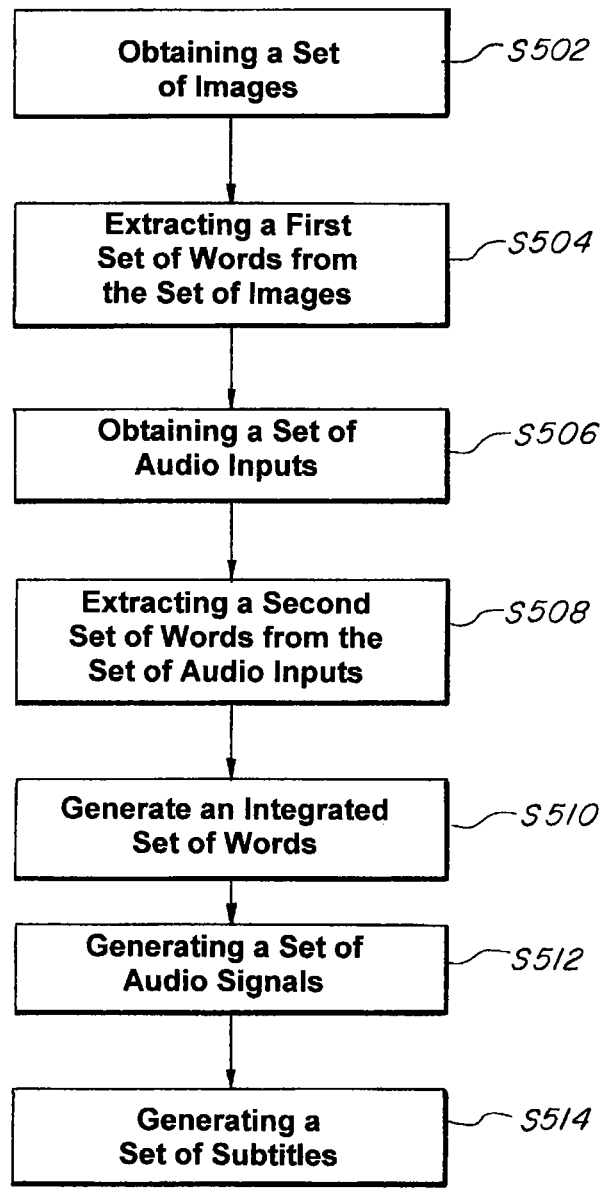
FIG. 5 is a flow chart of a process for extracting a message according to an alternate embodiment of the present invention.

FIG. 5 is a flow chart for a process for extracting a message from a person according to an embodiment of the present invention. In Step S502, a set of images is obtained. For example, the visual data processing unit 204 obtains the set of images from the image input unit 102. In Step S504, a first set of words is extracted from the set of images. For example, the visual data processing unit 204 extracts the first set of words from the set of images. In Step S506, a set of audio inputs is obtained. For example, the audio data processing unit 204 obtains the set of audio inputs from the voice input unit 202. In Step S508, a second set of words is extracted. For example, the audio data processing unit 204 extracts the second set of words from the set of audio inputs. In Step S510, an integrated set of words is generated. For example, the words integrator 236 generates the integrated set of words using the first set of words and the second set of words. In Step S512, a set of audio signals is generated. For example, the voice synthesizer 136 generates the set of audio signals using the second set of words. In Step S514, a set of subtitles are generated. For example, the subtitle unit 140 generates the set of subtitles using the first set of words.

Figure 6:
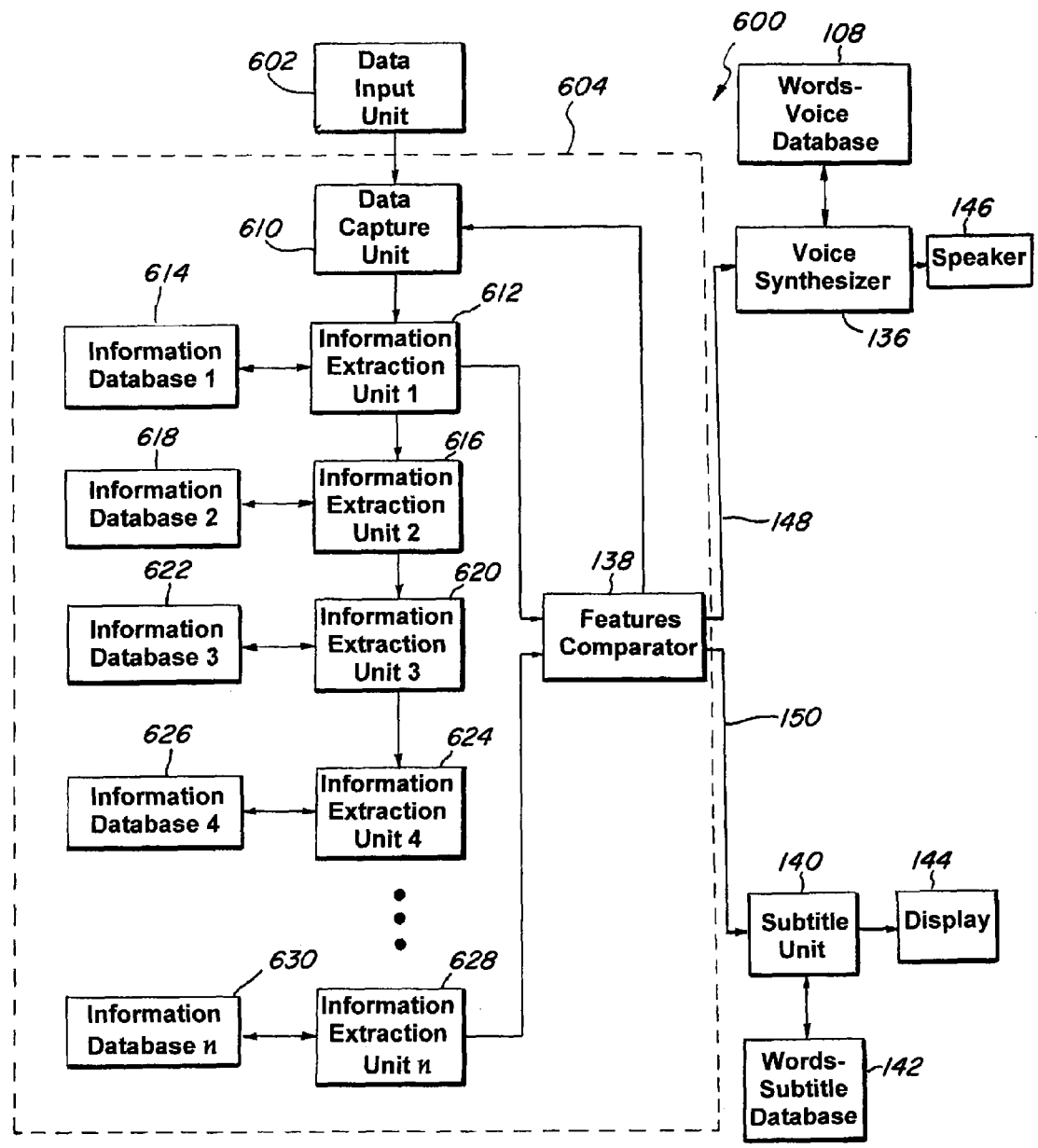
FIG. 6 is a block diagram of an alternate embodiment of the present invention.

FIG. 6 depicts yet another embodiment of the present invention. In FIG. 6, a message extraction system 600 includes a data input unit 602, a data processing unit 604, a voice synthesizer 136, a words-voice database 108, a speaker 146, a subtitle unit 140, a words-subtitle database 142, and a display 144. The data capture unit obtains a set of data from the data input unit 602. The information extraction unit 612 extracts a first set of features from the information database 614. The information extraction units 616, 620, and 624 through an information extraction unit immediately preceding information extraction unit 628 extracts a set of other features and/or a set of words using the information databases 618, 622, 626 through the information database immediately preceding information database 630. The information extraction unit 628 extracts a second set of features from the set of other features and/or the set of words using the information database 630.

The features comparator 138 receives the set of words, the first set of features, and the second set of features. The features comparator 138 compares the first set of features to the second set of features to determine if there is a match. If there is no match, the features comparator 138 instructs the data capture unit 610 to capture another set of data. If there is a match, the features comparator 138 transmits the set of words to the voice synthesizer 136 and the subtitle unit 140 through the output signal 148 and the output signal 150, respectively. The voice synthesizer 136 generates a set of audio signals from the set of words using the words-voice database 108. The set of audio signals are played back by the speaker 146. The subtitle unit 140 generates a set of subtitles from the set of words using the words-subtitle database 142. The set of subtitles are displayed using the display 144.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A message extraction system comprising:
    an image capture unit obtaining a set of images;
    a first features extraction unit communicatively coupled to the image capture unit to extract a first set of body features from the generated set of images;
    a words extraction unit communicatively coupled to the first features extraction unit to generate a first set of words from the first set of body features;
    a second features extraction unit communicatively coupled to the words extraction unit to generate a second set of body features from the generated first set of words;
    a features comparator communicatively coupled to the first features extraction unit and the second features extraction unit to determine whether the first set of body features matches the second set of body features and outputting the generated first set of words when the first set of body features matches the second set of body features; and
    a processor for coordinating the image capture unit, the first features extraction unit, the words extraction unit, the second features extraction unit, and the features comparator.

2. The system of claim 1 further comprising a voice synthesizer unit communicatively coupled to the features comparator to generate an audio signal corresponding to the generated first set of words.

3. The system of claim 1 further comprising a meanings extraction unit communicatively coupled to the first features extraction unit to generate a meaning from the first set of body features.

4. The system of claim 3 further comprising a contexts extraction unit communicatively coupled to the meanings extraction unit to generate a context from the first set of body features.

5. The system of claim 1 wherein the first set of body features includes facial expressions.

6. The system of claim 1 wherein the first set of body features includes hand gestures.

7. The system of claim 1 further comprising:
    an audio data processing unit receiving an audio input and generating a second set of words based on the audio input; and
    a words integrator to integrate the generated first set of words and the generated second set of words and generate an integrated set of words.

8. The system of claim 7 further comprising a voice synthesizer unit communicatively coupled to the words integrator to generate an audio signal corresponding to the integrated set of words.

9. The system of claim 7 further comprising a subtitle unit communicatively coupled to the words integrator to generate a set of subtitles corresponding to the integrated set of words.

10. The system of claim 1 further comprising a features database communicatively coupled to the first features extraction unit storing body features used to generate the first set of body features.

11. The system of claim 1 wherein the features comparator is configured to output the first set of words to an electronic device, and the first set of words is configured to operate the electronic device.

12. A message extraction system comprising:
    a visual data processing unit for obtaining a set of images, and generating a first set of words based on the set of images, and verifying the first set of words by comparing a first set of body features generated from the set of images with a second set of body features generated from the first set of words;
    an audio data processing unit for obtaining a set of audio inputs and generating a second set of words based on the set of audio inputs;
    a words integrator communicatively coupled to the visual data processing unit and the audio data processing unit to integrate the verified first set of words and the generated second set of words to generate an integrated set of words; and
    a processor for coordinating the visual data processing unit, the audio data processing unit, and the words integrator, wherein the processor is configured to output the integrated set of words to an electronic device, and the integrated set of words is configured to operate the electronic device.

13. The system of claim 12 further comprising a voice synthesizer unit communicatively coupled to the words integrator to generate an audio signal corresponding to the integrated set of words.

14. The system of claim 12 further comprising a subtitle unit communicatively coupled to the words integrator to generate a set of subtitles corresponding to the integrated set of words.

15. The system of claim 12 further comprising an image input unit communicatively coupled to the visual data processing unit to generate the set of images.

16. The system of claim 12 wherein the generated set of image corresponds to body features.

17. A method for extracting a message comprising a processor configured for:
  obtaining a set of images;
  extracting a first set of body features corresponding to the set of images;
  generating a first set of words from the first set of body features;
  generating a second set of body features from the first set of words;
  comparing the first set of body features to the second set of body features to determine whether the first set of body features matches the second set of body features; and
  outputting the first set of words when the first set of body features matches the second set of body features.

18. The method of claim 17 further comprising the step of generating an audio signal corresponding to the first set of words.

19. The method of claim 17 further comprising the steps of:
  receiving a set of audio inputs and generating a second set of words based on the set of audio input;
  integrating the first set of words with the second set of words to generate an integrated set of words; and
  generating an audio signal corresponding to the integrated set of words.

20. The method of claim 17 further comprising the step of generating a set of subtitles corresponding to the first set of words.

\* \* \* \* \*